(12) United States Patent
Bita et al.

(10) Patent No.: US 7,969,641 B2
(45) Date of Patent: Jun. 28, 2011

(54) DEVICE HAVING POWER GENERATING BLACK MASK AND METHOD OF FABRICATING THE SAME

(75) Inventors: Ion Bita, San Jose, CA (US);
Chun-Ming Wang, Fremont, CA (US);
Gang Xu, Cupertino, CA (US)

(73) Assignee: QUALCOMM MEMS Technologies, Inc., San Diego, CA (US)

( * ) Notice: Subject to any disclaimer, the term of this patent is extended or adjusted under 35 U.S.C. 154(b) by 217 days.

(21) Appl. No.: 12/371,538

(22) Filed: Feb. 13, 2009

(65) Prior Publication Data

US 2009/0207473 A1    Aug. 20, 2009

Related U.S. Application Data

(60) Provisional application No. 61/028,721, filed on Feb. 14, 2008.

(51) Int. Cl.
*G02B 7/02* (2006.01)
(52) U.S. Cl. ............... 359/290; 359/315; 349/27
(58) Field of Classification Search .......... 359/290, 359/315, 242, 245; 349/27, 149
See application file for complete search history.

(56) References Cited

U.S. PATENT DOCUMENTS

| | | | |
|---|---|---|---|
| 4,441,791 A | 4/1984 | Hornbeck | |
| 4,571,603 A | 2/1986 | Hornbeck et al. | |
| 4,748,366 A | 5/1988 | Taylor | |
| 4,859,060 A | 8/1989 | Katagiri et al. | |
| 4,954,789 A | 9/1990 | Sampsell | |
| 5,083,857 A | 1/1992 | Hornbeck | |
| 5,216,537 A | 6/1993 | Hornbeck | |
| 5,226,099 A | 7/1993 | Mignardi et al. | |
| 5,489,952 A | 2/1996 | Gove et al. | |
| 5,526,172 A | 6/1996 | Kanack | |
| 5,530,240 A | 6/1996 | Larson et al. | |
| 5,550,373 A | 8/1996 | Cole et al. | |
| 5,551,293 A | 9/1996 | Boysel et al. | |
| 5,629,521 A | 5/1997 | Lee et al. | |
| 5,815,141 A | 9/1998 | Phares | |
| 5,894,686 A | 4/1999 | Parker et al. | |
| 5,977,945 A | 11/1999 | Ohshima | |
| 6,014,121 A | 1/2000 | Aratani et al. | |
| 6,040,937 A | 3/2000 | Miles | |
| 6,295,048 B1 | 9/2001 | Ward et al. | |
| 6,304,297 B1 | 10/2001 | Swan | |

(Continued)

FOREIGN PATENT DOCUMENTS

EP    0 649 010    4/1995

(Continued)

OTHER PUBLICATIONS

Brank et al., Sep. 2001, RF MEMS-based tunable filters, International Journal of RF and Microwave Computer-Aided Engineering, 11(5):276-284.

(Continued)

*Primary Examiner* — Timothy J Thompson
(74) *Attorney, Agent, or Firm* — Knobbe Martens Olson & Bear

(57) ABSTRACT

A power generating black mask comprising an anti-reflection layer deposited over a substrate, a first electrode layer deposited over the anti-reflection layer, a semi-conductor layer deposited over the first electrode layer and a second electrode layer deposited over the semi-conductor layer.

14 Claims, 14 Drawing Sheets

U.S. PATENT DOCUMENTS

| | | | |
|---|---|---|---|
| 6,307,194 B1 | 10/2001 | Fitzgibbons et al. | |
| 6,556,515 B1* | 4/2003 | Sekiguchi | 368/242 |
| 6,666,561 B1 | 12/2003 | Blakley | |
| 6,674,562 B1 | 1/2004 | Miles | |
| 6,737,979 B1 | 5/2004 | Smith et al. | |
| 6,819,469 B1 | 11/2004 | Koba | |
| 6,829,132 B2 | 12/2004 | Martin et al. | |
| 7,123,216 B1 | 10/2006 | Miles | |
| 7,138,984 B1 | 11/2006 | Miles | |
| 7,280,265 B2 | 10/2007 | Miles | |
| 7,327,510 B2 | 2/2008 | Cummings et al. | |
| 7,369,294 B2 | 5/2008 | Gally et al. | |
| 7,460,246 B2 | 12/2008 | Kothari | |
| 2002/0075555 A1 | 6/2002 | Miles | |
| 2003/0112507 A1 | 6/2003 | Divelbiss et al. | |
| 2003/0117382 A1 | 6/2003 | Pawlowski et al. | |
| 2003/0128197 A1 | 7/2003 | Turner et al. | |
| 2004/0024580 A1 | 2/2004 | Salmonsen et al. | |
| 2005/0001797 A1 | 1/2005 | Miller et al. | |
| 2005/0068254 A1 | 3/2005 | Booth | |
| 2006/0066503 A1 | 3/2006 | Sampsell et al. | |
| 2006/0066504 A1 | 3/2006 | Sampsell et al. | |
| 2006/0066595 A1 | 3/2006 | Sampsell et al. | |
| 2006/0066596 A1 | 3/2006 | Sampsell et al. | |
| 2006/0067028 A1 | 3/2006 | Floyd | |
| 2006/0077393 A1 | 4/2006 | Gally et al. | |
| 2006/0077521 A1 | 4/2006 | Gally et al. | |
| 2006/0077617 A1 | 4/2006 | Floyd | |
| 2006/0176241 A1 | 8/2006 | Sampsell | |
| 2007/0023851 A1 | 2/2007 | Hartzell et al. | |
| 2007/0102035 A1 | 5/2007 | Yang | |
| 2007/0132843 A1 | 6/2007 | Miles | |
| 2007/0200839 A1 | 8/2007 | Sampsell | |
| 2007/0242008 A1 | 10/2007 | Cummings | |
| 2007/0247406 A1 | 10/2007 | Zhou et al. | |
| 2008/0112031 A1 | 5/2008 | Gally et al. | |
| 2008/0241356 A1* | 10/2008 | Fu et al. | 427/74 |
| 2009/0009847 A1 | 1/2009 | Sasagawa et al. | |
| 2009/0141286 A1 | 6/2009 | Kothari | |
| 2009/0267869 A1 | 10/2009 | Gally et al. | |
| 2009/0267953 A1 | 10/2009 | Sampsell et al. | |
| 2009/0308452 A1 | 12/2009 | Sasagawa et al. | |
| 2010/0117761 A1 | 5/2010 | Floyd | |
| 2010/0149722 A1 | 6/2010 | Floyd | |
| 2010/0220248 A1 | 9/2010 | Miles | |

FOREIGN PATENT DOCUMENTS

| | | |
|---|---|---|
| EP | 0 725 380 | 8/1996 |
| JP | 4-190323 | 7/1992 |
| KR | 2008 0001515 | 1/2008 |
| WO | WO 2004/066256 | 8/2004 |
| WO | WO 2005/066596 | 7/2005 |

OTHER PUBLICATIONS

Miles, "A New Reflective FPD Technology Using Interferometric Modulation," Journal of the SID 5/4, 1997, pp. 379-382.

Mark W. Miles, "MEMS-based interferometric modulator for display applications," Proceedings of SPIE, vol. 3876, Aug. 1999, pp. 20-28.

Miles et al., 10.1: Digital Paper™ for reflective displays, SID 02 Digest, pp. 115-117, 2002.

Winton, John M., "A novel way to capture solar energy," Chemical Week, pp. 17-18 (May 15, 1985).

Wu, "Design of a Reflective Color LCD Using Optical Interference Reflectors," ASIA Display '95, pp. 929-931 (Oct. 16, 1995).

ISR and WO dated Sep. 13, 2010 in PCT/US09/033240.

* cited by examiner

|  | Column Output Signals | |
|---|---|---|
|  | $+V_{bias}$ | $-V_{bias}$ |
| Row Output Signals   0 | Stable | Stable |
| $+\Delta V$ | Relax | Actuate |
| $-\Delta V$ | Actuate | Relax |

| | THICKNESS (nm) | %R |
|---|---|---|
| ITO | 72 | 0.5% |
| a_Si | 15 | |
| Cr | 100 | |

US 7,969,641 B2

DEVICE HAVING POWER GENERATING BLACK MASK AND METHOD OF FABRICATING THE SAME

CROSS-REFERENCE TO RELATED APPLICATIONS

This application claims the benefit of U.S. Provisional Patent Application No. 61/028,721, titled "DEVICE HAVING POWER GENERATING BLACK MASK AND METHOD OF FABRICATING THE SAME," filed Feb. 14, 2008. The disclosure of the above-reference application is considered part of the disclosure of this application and is incorporated by reference herein.

BACKGROUND

1. Field of the Invention

The field of the invention relates to microelectromechanical systems (MEMS).

2. Description of the Related Technology

Microelectromechanical systems (MEMS) include micro mechanical elements, actuators, and electronics. Micromechanical elements may be created using deposition, etching, and/or other micromachining processes that etch away parts of substrates and/or deposited material layers or that add layers to form electrical and electromechanical devices. One type of MEMS device is called an interferometric modulator. As used herein, the term interferometric modulator or interferometric light modulator refers to a device that selectively absorbs and/or reflects light using the principles of optical interference. In certain embodiments, an interferometric modulator may comprise a pair of conductive plates, one or both of which may be transparent and/or reflective in whole or part and capable of relative motion upon application of an appropriate electrical signal. In a particular embodiment, one plate may comprise a stationary layer deposited on a substrate and the other plate may comprise a metallic membrane separated from the stationary layer by an air gap. As described herein in more detail, the position of one plate in relation to another can change the optical interference of light incident on the interferometric modulator. Such devices have a wide range of applications, and it would be beneficial in the art to utilize and/or modify the characteristics of these types of devices so that their features can be exploited in improving existing products and creating new products that have not yet been developed.

SUMMARY

In one embodiment, an electronic device comprises a display area comprising a plurality of optical display elements, and a photovoltaic black mask deposited in the areas between the optical display elements of the display area, wherein the photovoltaic black mask comprises at least one layer being configured to absorb light, and at least one layer being configured to generate power.

In another embodiment, a method of making a photovoltaic black mask comprises depositing an anti-reflection layer over a substrate, depositing a first electrode over the anti-reflection layer, depositing a semiconductor layer over the first electrode layer, depositing a second electrode over the semiconductor layer, and patterning a portion of the anti-reflection layer, the first electrode layer, the semiconductor layer, and the second electrode layer.

In another embodiment, an electronic device comprises a display area comprising a plurality of optical display elements, means for absorbing light, and means for generating power wherein the absorbing means and the power generating means are deposited in the areas between the optical display elements of the display area.

DETAILED DESCRIPTION

Figure 1:
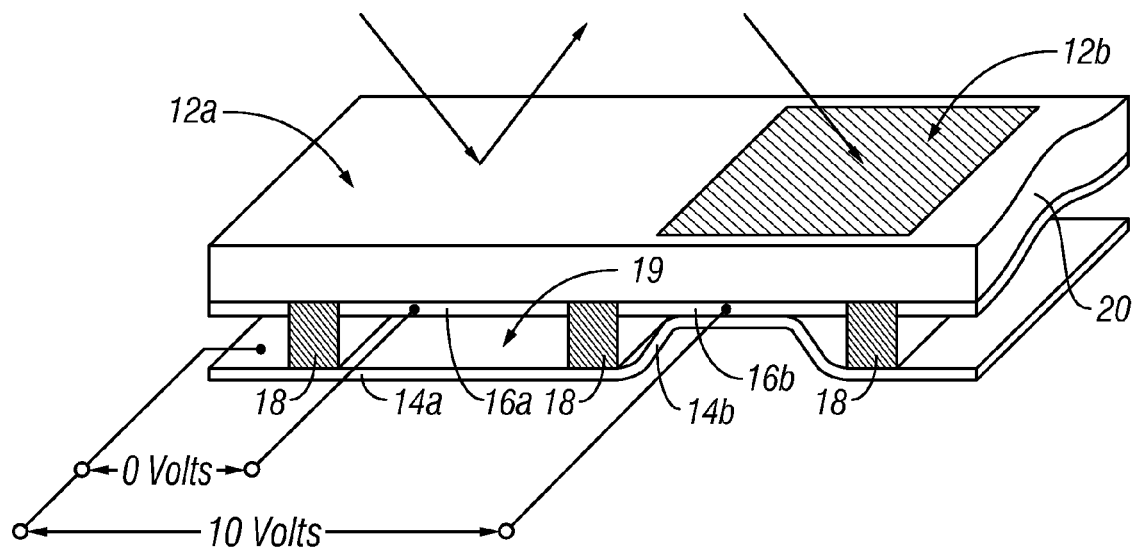
FIG. 1 is an isometric view depicting a portion of one embodiment of an interferometric modulator display in which a movable reflective layer of a first interferometric modulator is in a relaxed position and a movable reflective layer of a second interferometric modulator is in an actuated position.

The following detailed description is directed to certain specific embodiments. However, other embodiments may be used and some elements can be embodied in a multitude of different ways. In this description, reference is made to the drawings wherein like parts are designated with like numerals throughout. As will be apparent from the following description, the embodiments may be implemented in any device that is configured to display an image, whether in motion (e.g., video) or stationary (e.g., still image), and whether textual or pictorial. More particularly, it is contemplated that the embodiments may be implemented in or associated with a variety of electronic devices such as, but not limited to, mobile telephones, wireless devices, personal data assistants (PDAs), hand-held or portable computers, GPS receivers/navigators, cameras, MP3 players, camcorders, game consoles, wrist watches, clocks, calculators, television monitors, flat panel displays, computer monitors, auto displays (e.g., odometer display, etc.), cockpit controls and/or displays, display of camera views (e.g., display of a rear view camera in a vehicle), electronic photographs, electronic billboards or signs, projectors, architectural structures, packaging, and aesthetic structures (e.g., display of images on a piece of jewelry). MEMS devices of similar structure to those described herein can also be used in non-display applications such as in electronic switching devices.

The desire for more power efficient mobile device displays while maintaining the visual quality of previous displays is facilitated by optical masks with power generating capabilities. For these and other reasons, it is desirable to decrease the amount of power used by the device or even generate enough power to charge additional components, while minimizing the amount of additional passive or non-active optical contents in a display. In one embodiment, a multi-purpose optical component that acts as a power generating optical mask, e.g., a "black mask," to absorb ambient or stray light and to improve the optical response of a display device by increasing the contrast ratio, and to also generate power for the device using the black mask. A power generating black mask may be used in visual displays and may generate power in order to reduce the overall power consumption of the device. In addition, a power generating black mask may generate enough power to charge a component of the device. In some applications, the black mask can reflect light of a predetermined wavelength to appear as a color other than black. In one embodiment, a MEMS display device, for example, an array of interferometric modulators, comprises a dynamic optical component (e.g., a dynamic interferometric modulator) and a static optical component (e.g., a static interferometric modulator) laterally offset from the dynamic optical component. The static optical component functions as the "black mask" to absorb ambient or stray light in non-active areas of a display to improve the optical response of the dynamic optical component, and acts as a power generating component. For example, non-active areas can include one or more areas of a MEMS display device other than the area corresponding to a movable reflective layer. A non-active area can also include an area of a display device that is not used to display an image or data rendered on the display device.

Although a MEMS device, which includes an interferometric modulator, will be used to illustrate one embodiment, it is to be understood that portions of the present disclosure may be applied to other optical devices such as various imaging display and optoelectronic devices in general, which have non-active areas which are required to be light-absorbing, but which do not include interferometric modulators (e.g., LCD, LED and plasma displays). As will be apparent from the following description, portions of the present disclosure may be implemented in any device that is configured to display an image, whether in motion (e.g., video) or stationary (e.g., still image), and whether textual or pictorial. More particularly, the present disclosure may be applied to a variety of electronic devices such as, but not limited to, mobile telephones, wireless devices, personal data assistants (PDAs), hand-held or portable computers, GPS receivers/navigators, cameras, MP3 players, camcorders, game consoles, wrist watches, clocks, calculators, television monitors, flat panel displays, computer monitors, auto displays (e.g., odometer display, etc.), cockpit controls and/or displays, display of camera views (e.g., display of a rear view camera in a vehicle), electronic photographs, electronic billboards or signs, projectors, architectural structures, packaging, and aesthetic structures (e.g., display of images on a piece of jewelry). MEMS devices of similar structure to those described herein can also be used in non-display applications such as in electronic switching devices. In addition, the present disclosure is not in any way limited to use in visual display devices.

One interferometric modulator display embodiment comprising an interferometric MEMS display element is illustrated in FIG. 1. In these devices, the pixels are in either a bright or dark state. In the bright ("on" or "open") state, the display element reflects a large portion of incident visible light to a user. When in the dark ("off" or "closed") state, the display element reflects little incident visible light to the user. Depending on the embodiment, the light reflectance properties of the "on" and "off" states may be reversed. MEMS pixels can be configured to reflect predominantly at selected colors, allowing for a color display in addition to black and white.

FIG. 1 is an isometric view depicting two adjacent pixels in a series of pixels of a visual display, wherein each pixel comprises a MEMS interferometric modulator. In some embodiments, an interferometric modulator display comprises a row/column array of these interferometric modulators. Each interferometric modulator includes a pair of reflective layers positioned at a variable and controllable distance from each other to form a resonant optical gap with at least one variable dimension. In one embodiment, one of the reflective layers may be moved between two positions. In the first position, referred to herein as the relaxed position, the movable reflective layer is positioned at a relatively large distance from a fixed partially reflective layer. In the second position, referred to herein as the actuated position, the movable reflective layer is positioned more closely adjacent to the partially reflective layer. Incident light that reflects from the two layers interferes constructively or destructively depending on the position of the movable reflective layer, producing either an overall reflective or non-reflective state for each pixel.

The depicted portion of the pixel array in FIG. 1 includes two adjacent interferometric modulators 12a and 12b. In the interferometric modulator 12a on the left, a movable reflective layer 14a is illustrated in a relaxed position at a predetermined distance from an optical stack 16a, which includes a partially reflective layer. In the interferometric modulator 12b on the right, the movable reflective layer 14b is illustrated in an actuated position adjacent to the optical stack 16b.

The optical stacks 16a and 16b (collectively referred to as optical stack 16), as referenced herein, typically comprise several fused layers, which can include an electrode layer, such as indium tin oxide (ITO), a partially reflective layer, such as chromium, and a transparent dielectric. The optical stack 16 is thus electrically conductive, partially transparent, and partially reflective, and may be fabricated, for example, by depositing one or more of the above layers onto a transparent substrate 20. The partially reflective layer can be formed from a variety of materials that are partially reflective such as various metals, semiconductors, and dielectrics. The partially reflective layer can be formed of one or more layers of materials, and each of the layers can be formed of a single material or a combination of materials.

In some embodiments, the layers of the optical stack 16 are patterned into parallel strips, and may form row electrodes in a display device as described further below. The movable reflective layers 14a, 14b may be formed as a series of parallel strips of a deposited metal layer or layers (orthogonal to the row electrodes of 16a, 16b) deposited on top of posts 18 and an intervening sacrificial material deposited between the posts 18. When the sacrificial material is etched away, the movable reflective layers 14a, 14b are separated from the optical stacks 16a, 16b by a defined gap 19. A highly conductive and reflective material such as aluminum may be used for the reflective layers 14, and these strips may form column electrodes in a display device.

With no applied voltage, the gap 19 remains between the movable reflective layer 14a and optical stack 16a, with the movable reflective layer 14a in a mechanically relaxed state, as illustrated by the pixel 12a in FIG. 1. However, when a potential difference is applied to a selected row and column, the capacitor formed at the intersection of the row and column electrodes at the corresponding pixel becomes charged, and electrostatic forces pull the electrodes together. If the voltage is high enough, the movable reflective layer 14 is deformed and is forced against the optical stack 16. A dielectric layer (not illustrated in this Figure) within the optical stack 16 may prevent shorting and control the separation distance between layers 14 and 16, as illustrated by pixel 12b on the right in FIG. 1. The behavior is the same regardless of the polarity of the applied potential difference. In this way, row/column actuation that can control the reflective vs. non-reflective pixel states is analogous in many ways to that used in conventional LCD and other display technologies.

FIGS. 2 through 5B illustrate one exemplary process and system for using an array of interferometric modulators in a display application.

Figure 2:
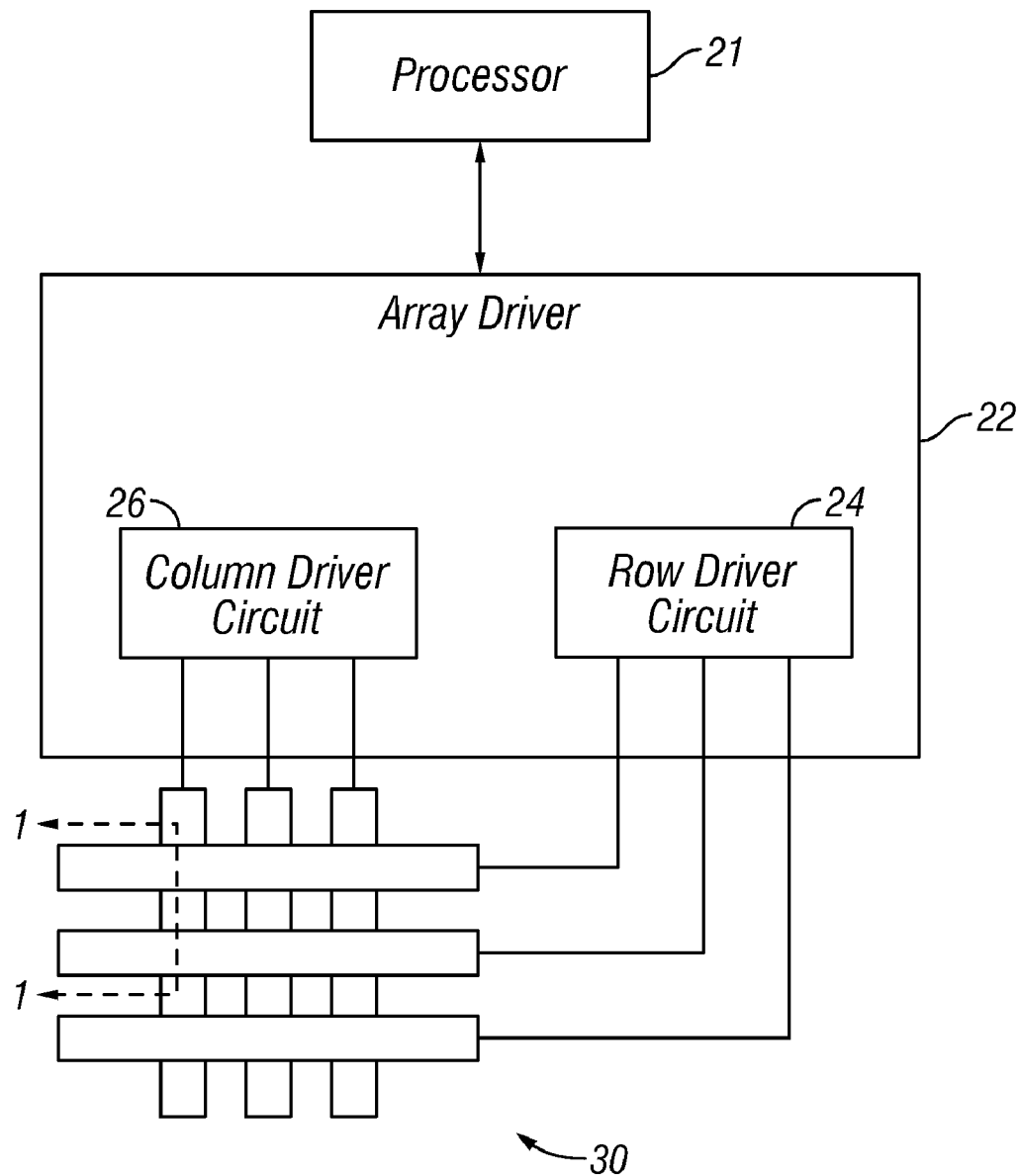
FIG. 2 is a system block diagram illustrating one embodiment of an electronic device incorporating a 3×3 interferometric modulator display.

FIG. 2 is a system block diagram illustrating one embodiment of an electronic device that may incorporate aspects of the invention. In the exemplary embodiment, the electronic device includes a processor 21 which may be any general purpose single- or multi-chip microprocessor such as an ARM, Pentium®, Pentium II®, Pentium III®, Pentium IV®, Pentium® Pro, an 8051, a MIPS®, a Power PC®, an ALPHA®, or any special purpose microprocessor such as a digital signal processor, microcontroller, or a programmable gate array. As is conventional in the art, the processor 21 may be configured to execute one or more software modules. In addition to executing an operating system, the processor may be configured to execute one or more software applications, including a web browser, a telephone application, an email program, or any other software application.

In one embodiment, the processor 21 is also configured to communicate with an array driver 22. In one embodiment, the array driver 22 includes a row driver circuit 24 and a column driver circuit 26 that provide signals to a display array or panel 30. The cross section of the array illustrated in FIG. 1 is shown by the lines 1-1 in FIG. 2. For MEMS interferometric modulators, the row/column actuation protocol may take advantage of a hysteresis property of these devices illustrated in FIG. 3. It may require, for example, a 10 volt potential difference to cause a movable layer to deform from the relaxed state to the actuated state. However, when the voltage is reduced from that value, the movable layer maintains its state as the voltage drops back below 10 volts. In the exemplary embodiment of FIG. 3, the movable layer does not relax completely until the voltage drops below 2 volts. Thus, there exists a window of applied voltage, about 3 to 7 V in the example illustrated in FIG. 3, within which the device is stable in either the relaxed or actuated state. This is referred to herein as the "hysteresis window" or "stability window." For a display array having the hysteresis characteristics of FIG. 3, the row/column actuation protocol can be designed such that during row strobing, pixels in the strobed row that are to be actuated are exposed to a voltage difference of about 10 volts, and pixels that are to be relaxed are exposed to a voltage difference of close to zero volts. After the strobe, the pixels are exposed to a steady state voltage difference of about 5 volts such that they remain in whatever state the row strobe put them in. After being written, each pixel sees a potential difference within the "stability window" of 3-7 volts in this example. This feature makes the pixel design illustrated in FIG. 1 stable under the same applied voltage conditions in either an actuated or relaxed pre-existing state. Since each pixel of the interferometric modulator, whether in the actuated or relaxed state, is essentially a capacitor formed by the fixed and moving reflective layers, this stable state can be held at a voltage within the hysteresis window with almost no power dissipation. Essentially no current flows into the pixel if the applied potential is fixed.

In typical applications, a display frame may be created by asserting the set of column electrodes in accordance with the desired set of actuated pixels in the first row. A row pulse is then applied to the row 1 electrode, actuating the pixels corresponding to the asserted column lines. The asserted set of column electrodes is then changed to correspond to the desired set of actuated pixels in the second row. A pulse is then applied to the row 2 electrode, actuating the appropriate pixels in row 2 in accordance with the asserted column electrodes. The row 1 pixels are unaffected by the row 2 pulse, and remain in the state they were set to during the row 1 pulse. This may be repeated for the entire series of rows in a sequential fashion to produce the frame. Generally, the frames are refreshed and/or updated with new display data by continually repeating this process at some desired number of frames per second. A wide variety of protocols for driving row and column electrodes of pixel arrays to produce display frames are also well known and may be used in conjunction with the present invention.

Figures 3, 4:
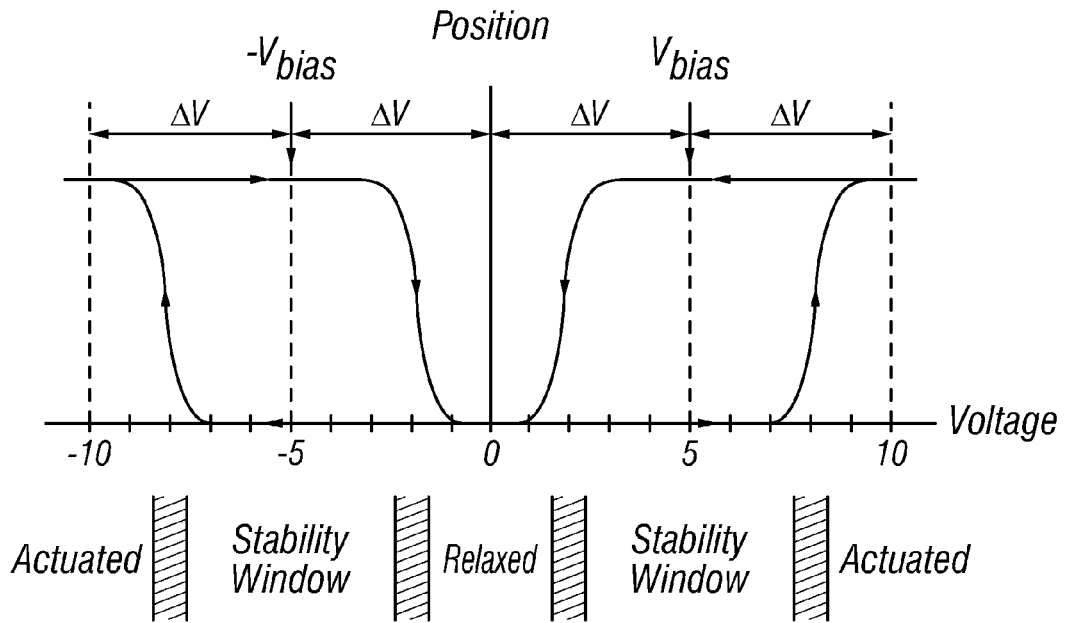
FIG. 3 is a diagram of movable mirror position versus applied voltage for one exemplary embodiment of an interferometric modulator of FIG. 1.
FIG. 4 is an illustration of a set of row and column voltages that may be used to drive an interferometric modulator display.
Figure 5A:
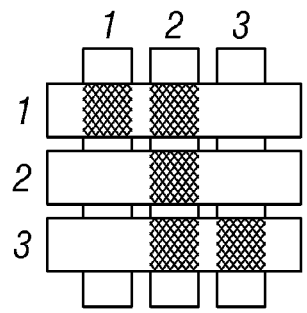
FIG. 5A illustrates one exemplary frame of display data in the 3×3 interferometric modulator display of FIG. 2.
Figure 5B:
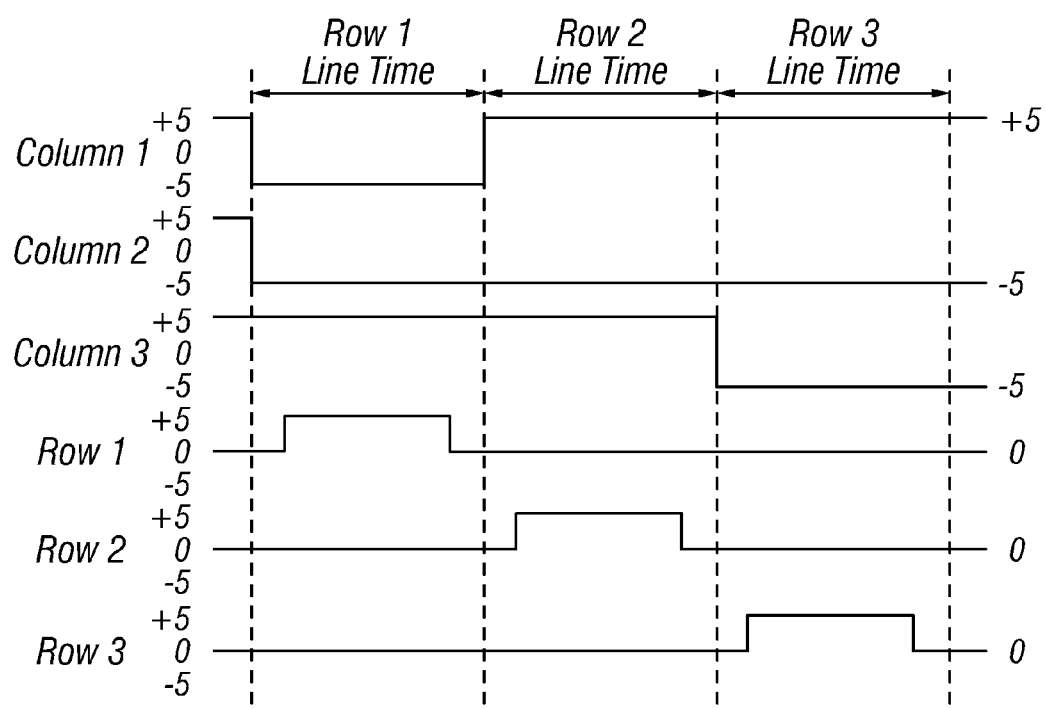
FIG. 5B illustrates one exemplary timing diagram for row and column signals that may be used to write the frame of FIG. 5A.

FIGS. 4, 5A, and 5B illustrate one possible actuation protocol for creating a display frame on the 3×3 array of FIG. 2. FIG. 4 illustrates a possible set of column and row voltage levels that may be used for pixels exhibiting the hysteresis curves of FIG. 3. In the FIG. 4 embodiment, actuating a pixel involves setting the appropriate column to $-V_{bias}$, and the appropriate row to $+\Delta V$, which may correspond to −5 volts and +5 volts, respectively. Relaxing the pixel is accomplished by setting the appropriate column to $+V_{bias}$, and the appropriate row to the same $+\Delta V$, producing a zero volt potential difference across the pixel. In those rows where the row voltage is held at zero volts, the pixels are stable in whatever state they were originally in, regardless of whether the column is at $+V_{bias}$, or $-V_{bias}$. As is also illustrated in FIG. 4, it will be appreciated that voltages of opposite polarity than those described above can be used, e.g., actuating a pixel can involve setting the appropriate column to $+V_{bias}$, and the appropriate row to $-\Delta V$. In this embodiment, releasing the pixel is accomplished by setting the appropriate column to $-V_{bias}$, and the appropriate row to the same $-\Delta V$, producing a zero volt potential difference across the pixel.

FIG. 5B is a timing diagram showing a series of row and column signals applied to the 3×3 array of FIG. 2 which will result in the display arrangement illustrated in FIG. 5A, where actuated pixels are non-reflective. Prior to writing the frame illustrated in FIG. 5A, the pixels can be in any state, and in this example, all the rows are at 0 volts, and all the columns are at +5 volts. With these applied voltages, all pixels are stable in their existing actuated or relaxed states.

In the FIG. 5A frame, pixels (1,1), (1,2), (2,2), (3,2) and (3,3) are actuated. To accomplish this, during a "line time" for row 1, columns 1 and 2 are set to −5 volts, and column 3 is set to +5 volts. This does not change the state of any pixels, because all the pixels remain in the 3-7 volt stability window. Row 1 is then strobed with a pulse that goes from 0, up to 5 volts, and back to zero. This actuates the (1,1) and (1,2) pixels and relaxes the (1,3) pixel. No other pixels in the array are affected. To set row 2 as desired, column 2 is set to −5 volts, and columns 1 and 3 are set to +5 volts. The same strobe applied to row 2 will then actuate pixel (2,2) and relax pixels (2,1) and (2,3). Again, no other pixels of the array are affected. Row 3 is similarly set by setting columns 2 and 3 to −5 volts, and column 1 to +5 volts. The row 3 strobe sets the row 3 pixels as shown in FIG. 5A. After writing the frame, the row potentials are zero, and the column potentials can remain at either +5 or −5 volts, and the display is then stable in the arrangement of FIG. 5A. It will be appreciated that the same procedure can be employed for arrays of dozens or hundreds of rows and columns. It will also be appreciated that the timing, sequence, and levels of voltages used to perform row and column actuation can be varied widely within the general principles outlined above, and the above example is exemplary only, and any actuation voltage method can be used with the systems and methods described herein.

Figure 6A:
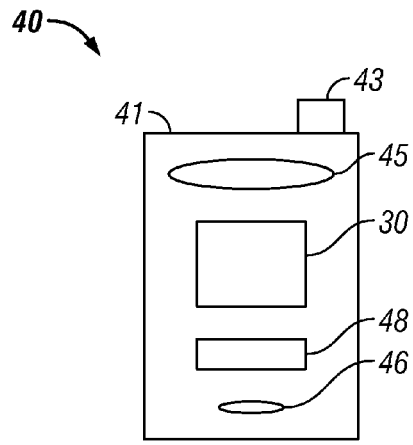
FIGS. 6A and 6B are system block diagrams illustrating an embodiment of a visual display device comprising a plurality of interferometric modulators.
Figure 6B:
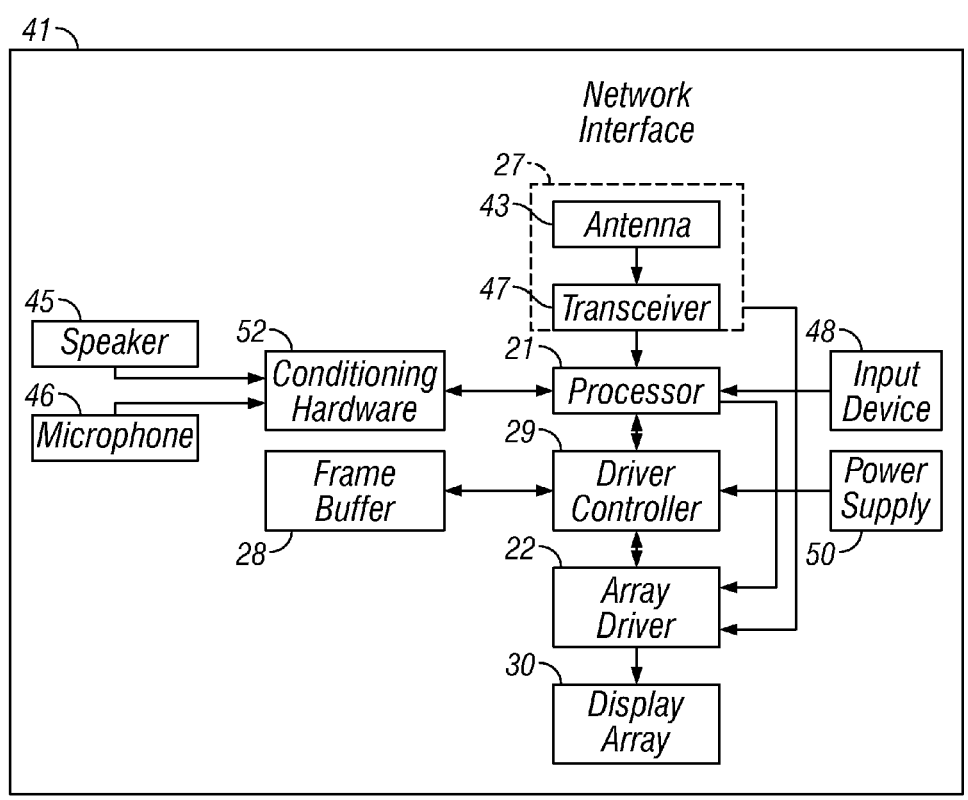

FIGS. 6A and 6B are system block diagrams illustrating an embodiment of a display device 40. The display device 40 can be, for example, a cellular or mobile telephone. However, the same components of display device 40 or slight variations thereof are also illustrative of various types of display devices such as televisions and portable media players.

The display device 40 includes a housing 41, a display 30, an antenna 43, a speaker 45, an input device 48, and a microphone 46. The housing 41 is generally formed from any of a variety of manufacturing processes as are well known to those of skill in the art, including injection molding and vacuum forming. In addition, the housing 41 may be made from any of a variety of materials, including, but not limited to, plastic, metal, glass, rubber, and ceramic, or a combination thereof. In one embodiment, the housing 41 includes removable portions (not shown) that may be interchanged with other removable portions of different color, or containing different logos, pictures, or symbols.

The display 30 of exemplary display device 40 may be any of a variety of displays, including a bi-stable display, as described herein. In other embodiments, the display 30 includes a flat-panel display, such as plasma, EL, OLED, STN LCD, or TFT LCD as described above, or a non-flat-panel display, such as a CRT or other tube device, as is well known to those of skill in the art. However, for purposes of describing the present embodiment, the display 30 includes an interferometric modulator display, as described herein.

The components of one embodiment of exemplary display device 40 are schematically illustrated in FIG. 6B. The illustrated exemplary display device 40 includes a housing 41 and can include additional components at least partially enclosed therein. For example, in one embodiment, the exemplary display device 40 includes a network interface 27 that includes an antenna 43, which is coupled to a transceiver 47. The transceiver 47 is connected to a processor 21, which is connected to conditioning hardware 52. The conditioning hardware 52 may be configured to condition a signal (e.g., filter a signal). The conditioning hardware 52 is connected to a speaker 45 and a microphone 46. The processor 21 is also connected to an input device 48 and a driver controller 29. The driver controller 29 is coupled to a frame buffer 28 and to an array driver 22, which in turn is coupled to a display array 30. A power supply 50 provides power to all components as required by the particular exemplary display device 40 design.

The network interface 27 includes the antenna 43 and the transceiver 47 so that the exemplary display device 40 can communicate with one or more devices over a network. In one embodiment, the network interface 27 may also have some processing capabilities to relieve requirements of the processor 21. The antenna 43 is any antenna known to those of skill in the art for transmitting and receiving signals. In one embodiment, the antenna transmits and receives RF signals according to the IEEE 802.11 standard, including IEEE 802.11(a), (b), or (g). In another embodiment, the antenna transmits and receives RF signals according to the BLUETOOTH standard. In the case of a cellular telephone, the antenna is designed to receive CDMA, GSM, AMPS, or other known signals that are used to communicate within a wireless cell phone network. The transceiver 47 pre-processes the signals received from the antenna 43 so that they may be received by and further manipulated by the processor 21. The transceiver 47 also processes signals received from the processor 21 so that they may be transmitted from the exemplary display device 40 via the antenna 43.

In an alternative embodiment, the transceiver 47 can be replaced by a receiver. In yet another alternative embodiment, network interface 27 can be replaced by an image source, which can store or generate image data to be sent to the processor 21. For example, the image source can be a digital video disc (DVD) or a hard-disc drive that contains image data, or a software module that generates image data.

Processor 21 generally controls the overall operation of the exemplary display device 40. The processor 21 receives data, such as compressed image data from the network interface 27 or an image source, and processes the data into raw image data or into a format that is readily processed into raw image data. The processor 21 then sends the processed data to the driver controller 29 or to frame buffer 28 for storage. Raw data typically refers to the information that identifies the image characteristics at each location within an image. For example, such image characteristics can include color, saturation, and gray-scale level.

In one embodiment, the processor 21 includes a microcontroller, CPU, or logic unit to control operation of the exemplary display device 40. Conditioning hardware 52 generally includes amplifiers and filters for transmitting signals to the speaker 45, and for receiving signals from the microphone 46. Conditioning hardware 52 may be discrete components within the exemplary display device 40, or may be incorporated within the processor 21 or other components.

The driver controller 29 takes the raw image data generated by the processor 21 either directly from the processor 21 or from the frame buffer 28 and reformats the raw image data appropriately for high speed transmission to the array driver 22. Specifically, the driver controller 29 reformats the raw image data into a data flow having a raster-like format, such that it has a time order suitable for scanning across the display array 30. Then the driver controller 29 sends the formatted information to the array driver 22. Although a driver controller 29, such as a LCD controller, is often associated with the system processor 21 as a stand-alone Integrated Circuit (IC), such controllers may be implemented in many ways. They may be embedded in the processor 21 as hardware, embedded in the processor 21 as software, or fully integrated in hardware with the array driver 22.

Typically, the array driver 22 receives the formatted information from the driver controller 29 and reformats the video data into a parallel set of waveforms that are applied many times per second to the hundreds and sometimes thousands of leads coming from the display's x-y matrix of pixels.

In one embodiment, the driver controller 29, array driver 22, and display array 30 are appropriate for any of the types of displays described herein. For example, in one embodiment, driver controller 29 is a conventional display controller or a bi-stable display controller (e.g., an interferometric modulator controller). In another embodiment, array driver 22 is a conventional driver or a bi-stable display driver (e.g., an interferometric modulator display). In one embodiment, a driver controller 29 is integrated with the array driver 22. Such an embodiment is common in highly integrated systems such as cellular phones, watches, and other small area displays. In yet another embodiment, display array 30 is a typical display array or a bi-stable display array (e.g., a display including an array of interferometric modulators).

The input device 48 allows a user to control the operation of the exemplary display device 40. In one embodiment, input device 48 includes a keypad, such as a QWERTY keyboard or a telephone keypad, a button, a switch, a touch-sensitive screen, or a pressure- or heat-sensitive membrane. In one embodiment, the microphone 46 is an input device for the exemplary display device 40. When the microphone 46 is used to input data to the device, voice commands may be provided by a user for controlling operations of the exemplary display device 40.

Power supply 50 can include a variety of energy storage devices as are well known in the art. For example, in one embodiment, power supply 50 is a rechargeable battery, such as a nickel-cadmium battery or a lithium ion battery. In another embodiment, power supply 50 is a renewable energy source, a capacitor, or a solar cell including a plastic solar cell, and solar-cell paint. In another embodiment, power supply 50 is configured to receive power from a wall outlet.

In some embodiments, control programmability resides, as described above, in a driver controller which can be located in several places in the electronic display system. In some embodiments, control programmability resides in the array driver 22. Those of skill in the art will recognize that the above-described optimizations may be implemented in any number of hardware and/or software components and in various configurations.

Figure 7A:
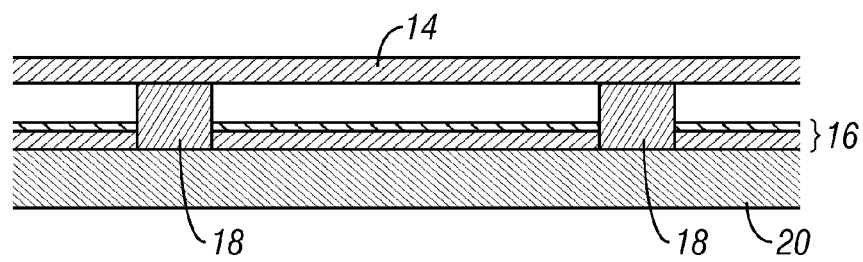
FIG. 7A is a cross section of the device of FIG. 1.
Figure 7B:
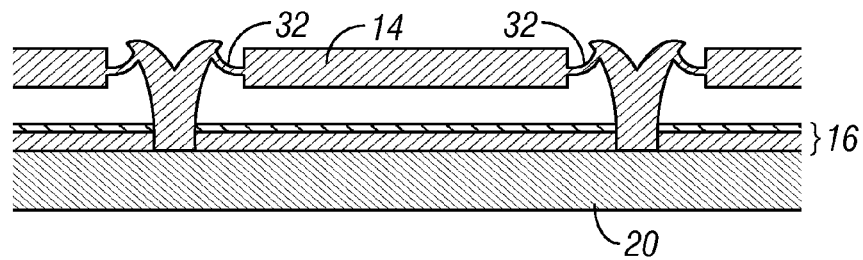
FIG. 7B is a cross section of an alternative embodiment of an interferometric modulator.
Figure 7C:
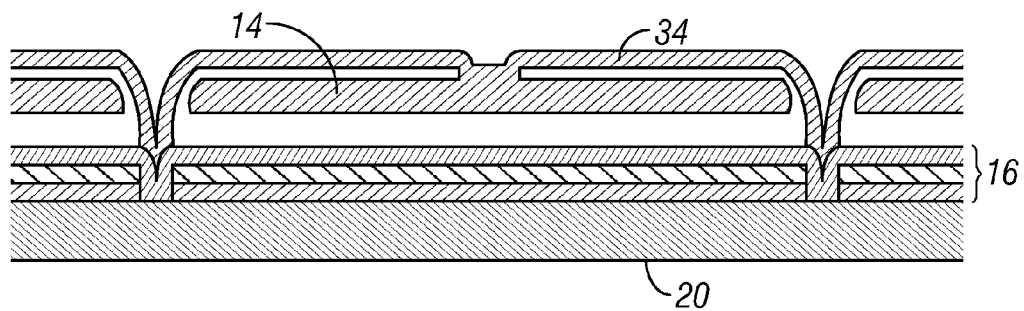
FIG. 7C is a cross section of another alternative embodiment of an interferometric modulator.
Figure 7D:
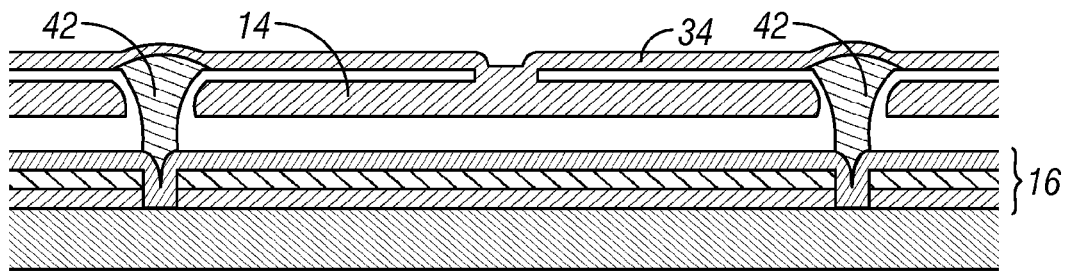
FIG. 7D is a cross section of yet another alternative embodiment of an interferometric modulator.
Figure 7E:
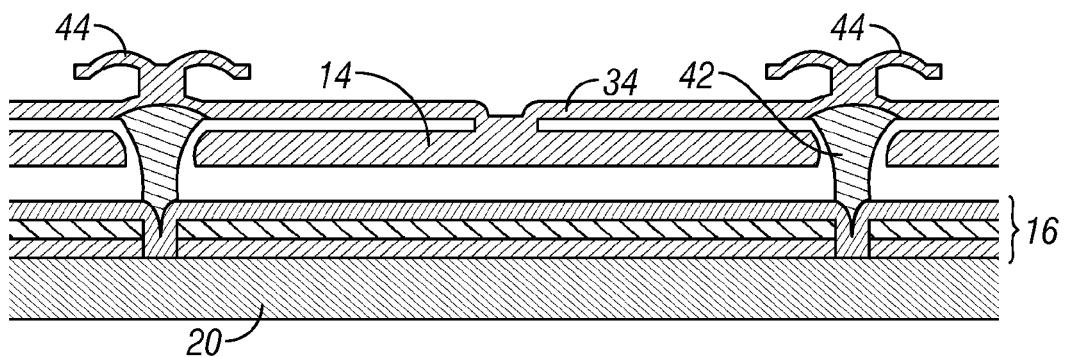
FIG. 7E is a cross section of an additional alternative embodiment of an interferometric modulator.

The details of the structure of interferometric modulators that operate in accordance with the principles set forth above may vary widely. For example, FIGS. 7A-7E illustrate five different embodiments of the movable reflective layer 14 and its supporting structures. FIG. 7A is a cross section of the embodiment of FIG. 1, where a strip of metal material 14 is deposited on orthogonally extending supports 18. In FIG. 7B, the moveable reflective layer 14 is attached to supports at the corners only, on tethers 32. In FIG. 7C, the moveable reflective layer 14 is suspended from a deformable layer 34, which may comprise a flexible metal. The deformable layer 34 connects, directly or indirectly, to the substrate 20 around the perimeter of the deformable layer 34. These connections are herein referred to as support posts. The embodiment illustrated in FIG. 7D has support post plugs 42 upon which the deformable layer 34 rests. The movable reflective layer 14 remains suspended over the gap, as in FIGS. 7A-7C, but the deformable layer 34 does not form the support posts by filling holes between the deformable layer 34 and the optical stack 16. Rather, the support posts are formed of a planarization material, which is used to form support post plugs 42. The embodiment illustrated in FIG. 7E is based on the embodiment shown in FIG. 7D, but may also be adapted to work with any of the embodiments illustrated in FIGS. 7A-7C, as well as additional embodiments not shown. In the embodiment shown in FIG. 7E, an extra layer of metal or other conductive material has been used to form a bus structure 44. This allows signal routing along the back of the interferometric modulators, eliminating a number of electrodes that may otherwise have had to be formed on the substrate 20.

In embodiments such as those shown in FIG. 7, the interferometric modulators function as direct-view devices, in which images are viewed from the front side of the transparent substrate 20, the side opposite to that upon which the modulator is arranged. In these embodiments, the reflective layer 14 optically shields the portions of the interferometric modulator on the side of the reflective layer opposite the substrate 20, including the deformable layer 34. This allows the shielded areas to be configured and operated upon without negatively affecting the image quality. Such shielding allows the bus structure 44 in FIG. 7E, which provides the ability to separate the optical properties of the modulator from the electromechanical properties of the modulator, such as addressing and the movements that result from that addressing. This separable modulator architecture allows the structural design and materials used for the electromechanical aspects and the optical aspects of the modulator to be selected and to function independently of each other. Moreover, the embodiments shown in FIGS. 7C-7E have additional benefits deriving from the decoupling of the optical properties of the reflective layer 14 from its mechanical properties, which are carried out by the deformable layer 34. This allows the structural design and materials used for the reflective layer 14 to be optimized with respect to the optical properties, and the structural design and materials used for the deformable layer 34 to be optimized with respect to desired mechanical properties.

Figure 8A:
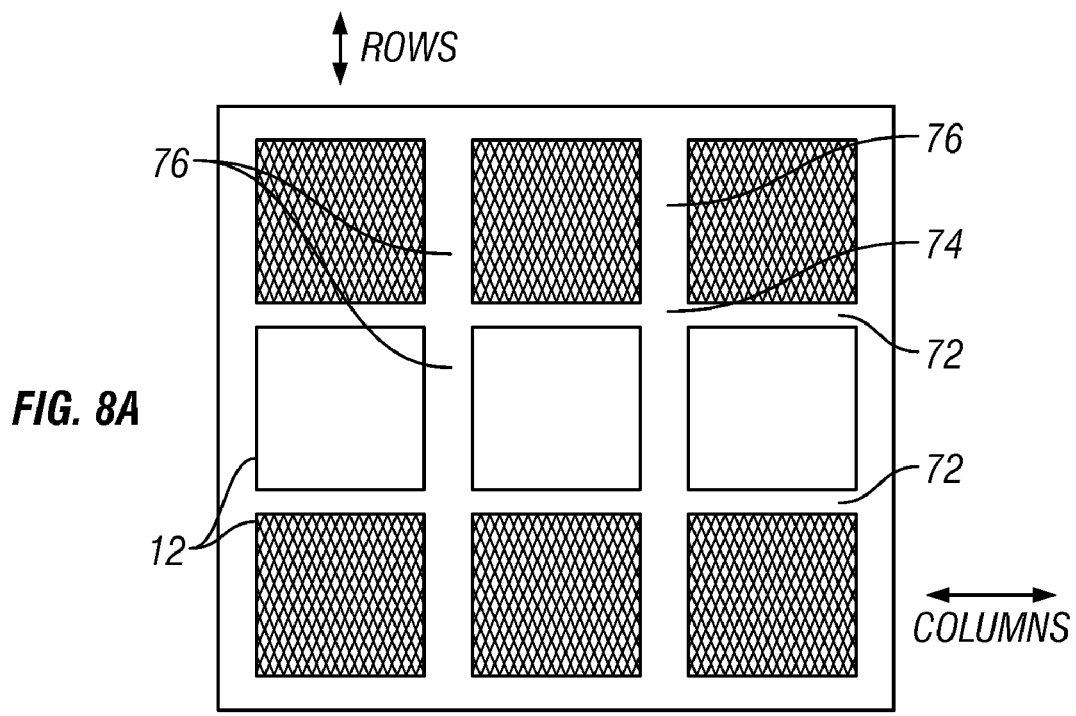
FIG. 8A is a top view of a portion of an interferometric modulator array illustrating non-active areas containing structures included in a plurality of optical display elements.
Figure 8B:
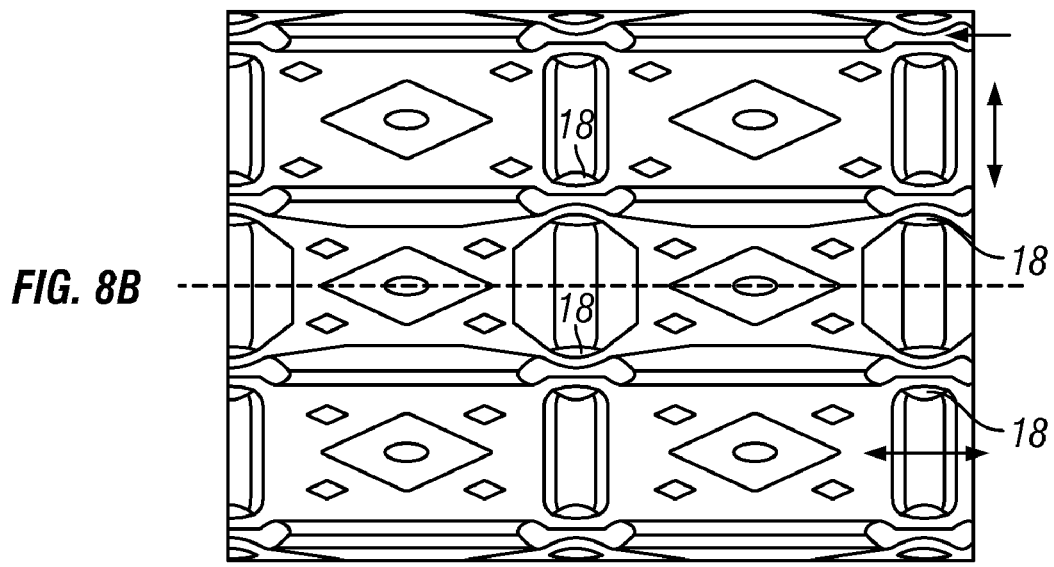
FIG. 8B is a top elevational view of a portion of an interferometric modulator array illustrating non-active areas containing structures included in a plurality of optical display elements.

FIGS. 8A and 8B illustrate an example of a portion of a display with display elements that can incorporate a black mask. FIGS. 8A and 8B illustrate an exemplary portion of a display that includes an array of interferometric modulators. A black mask can be used in the array shown in FIGS. 8A and 8B, and in any type of display where it is useful to mask off certain areas of the display from ambient light. FIG. 8A shows a plurality of pixels 12 of the array. FIG. 8B shows an example of supports 18 located on the plurality of pixels of the array of interferometric modulators that can be masked to improve the optical response of the display, from the "back" side of the substrate opposite the viewed "front" side of the display. To improve an optical response (e.g., contrast) of the display, it can be desirable to minimize light reflected from certain areas of the array. Any area of an interferometric modulator that increases the reflectance of the display in the dark state can be masked off (e.g., by disposing a mask between the structure and light entering the interferometric modulator) using a black mask in order to increase the contrast ratio. Some of the areas that can be masked to advantageously affect the display include, but are not limited to, row cuts between interferometric modulators 72 (FIG. 8A), the supports 18, bending areas of the movable mirror layers connecting to and/or around the supports 18 that are visible from the viewed side of the display, and areas between movable mirror layers of adjacent interferometric modulators 76 (FIG. 8A). The mask can be disposed in such areas so that it is spaced apart from the movable mirror of the interferometric modulators, e.g., so that ambient light can propagate to and reflect from the movable mirror, but the areas other than the movable mirror are masked, thus inhibiting ambient light from reflecting from any other structures in the masked areas. These areas that are masked can be referred to as "non-active areas" because they are static or not intended to provide light modulation, e.g., the areas do not include the movable mirror. In some embodiments, the mask can be disposed so that light entering the interferometric modulator falls onto either the masked area or the movable mirror. In other embodiments, at least a portion of the non-active areas are masked.

Figure 9:
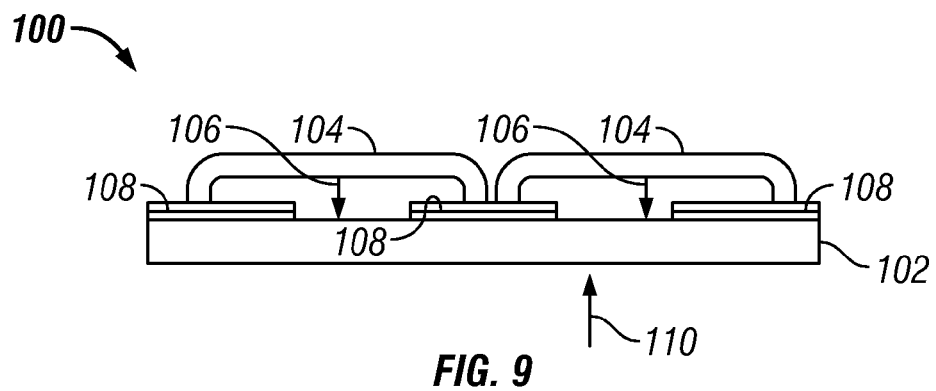
FIG. 9 shows a cross-section through a MEMS device having a mask or light-absorbing region in accordance with one embodiment.

FIG. 9 shows a cross-sectional view of a simplified representation of two elements of a multiple element display 100, according to one embodiment. The display comprises two optical components (other optical components not shown for clarity) which are, in this embodiment, interferometric modulators 104. As described above, interferometric modulator devices 104 comprise an arrangement of reflective and/or transmissive films that produce a desired optical response when the movable active area is driven towards a substrate 202 in a direction indicated by arrows 106. In FIG. 9, reference numerals 108 indicate non-active areas of the interferometric modulators 104. Typically, it is desirable that the non-active areas 108 be light-absorbing or to function as a black mask so that when a viewer looks at the display 100 from a direction indicated by the viewing arrow 110, the optical response produced by the interferometric modulator devices 104 is not degraded by the reflection of ambient light from the non-active areas 108. In other embodiments, it can be desirable to mask the non-active areas 108 with a colored mask (for example, green, red, blue, yellow, etc.) other than black.

A mask for a non-active area 108 may be fabricated from materials selected to have an optical response which absorbs or attenuates light. The materials used to fabricate the mask may be electrically conductive. According to embodiments herein, a mask for each non-active area 108 can be fabricated as a stack of thin films. For example, in one embodiment, the stack of thin films may comprise a reflector layer positioned over an absorber layer which is positioned over a non-light absorbing dielectric layer. In other embodiments, the non-active areas 108 may comprise a single layer of organic or inorganic materials which attenuates or absorbs light, and a layer of a conductive material such as chrome or aluminum.

Figure 10:
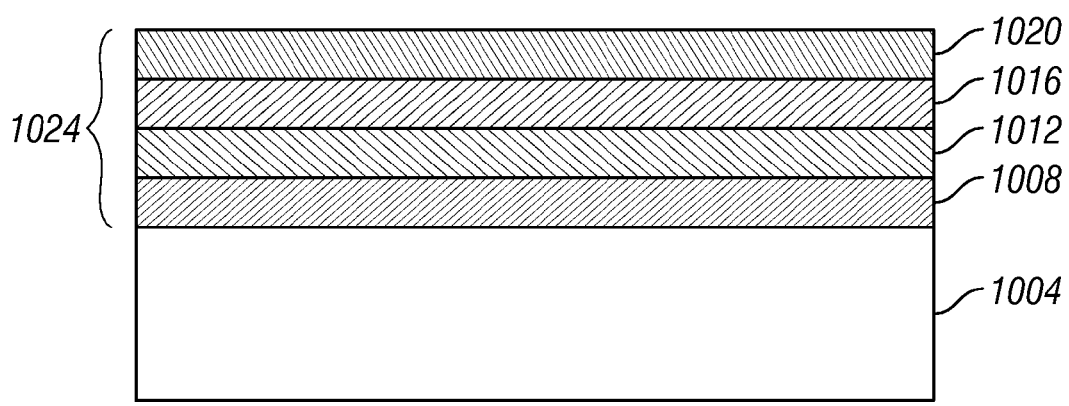
FIG. 10 illustrates a power generating black masking according to an embodiment.

FIG. 10 illustrates a power generating black mask 1024 according to an embodiment. The power generating black mask 1024 comprises a substrate 1004, an anti-reflection layer 1008 positioned over the substrate 1004, a first electrode layer 1012 positioned over the anti-reflection layer 1008, a semi-conductor layer 1016 is positioned over the first electrode layer 1012, and a second electrode layer 1020 is positioned over the semi-conductor layer 1016. Black masks improve the visual quality of display devices. This improvement is provided by a variety of features of the black mask. For example, black masks minimize the amount of additional passive or non-active optical contents in a display. In addition, black masks absorb ambient or stray light and improve the optical response of a display device by increasing the contrast ratio. A power generating black mask according to an embodiment provides all of the benefits listed above and provides additional benefits. The power generating component of the black mask may allow the device to use less power. In addition, the power generating component of the black mask may be used to generate power to charge at least one component in the device. For example, the power generating black mask may generate enough power to charge a battery used by the device. Or, the power generating black mask may provide power to other components in the device.

Figure 11A:
FIGS. 11A-11G illustrate a method of manufacture for a power generating black mask according to an embodiment.
Figure 11B:
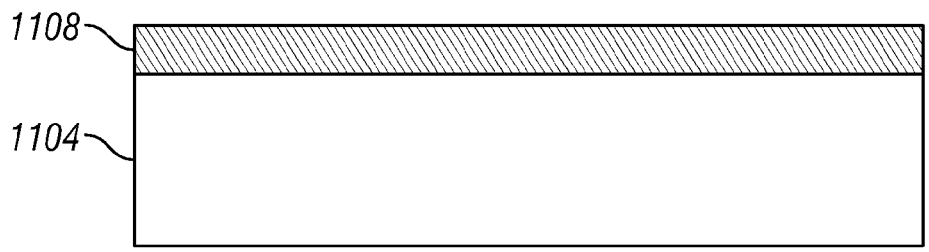
Figure 11C:
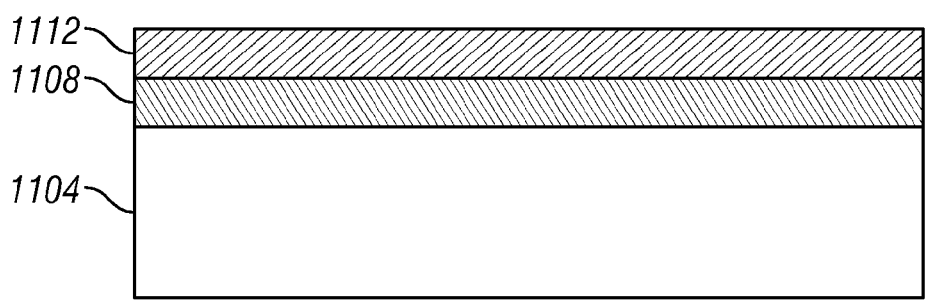
Figure 11D:
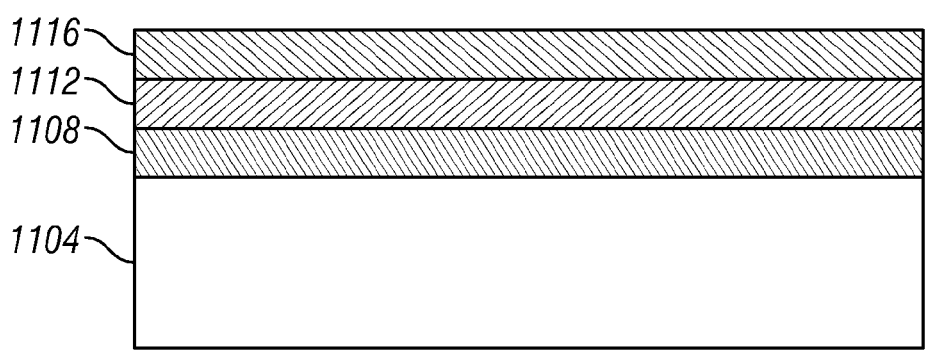
Figure 11E:
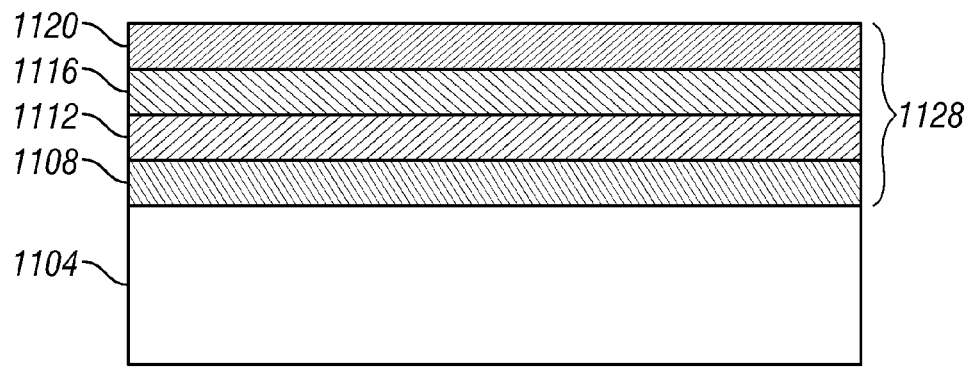
Figure 11F:
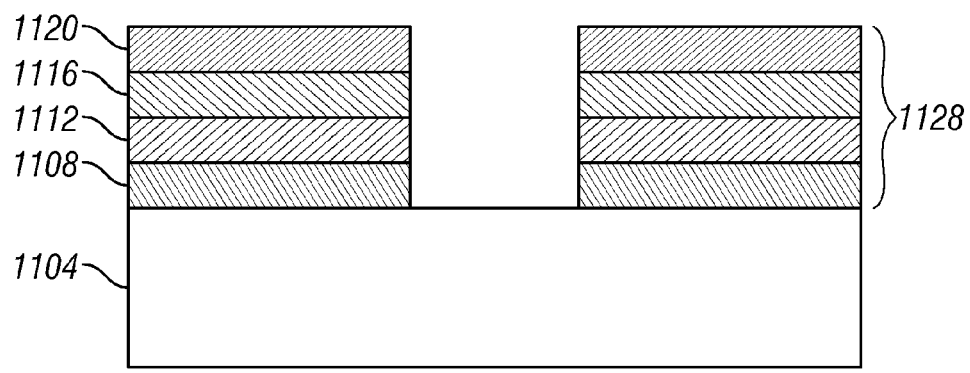
Figure 11G:
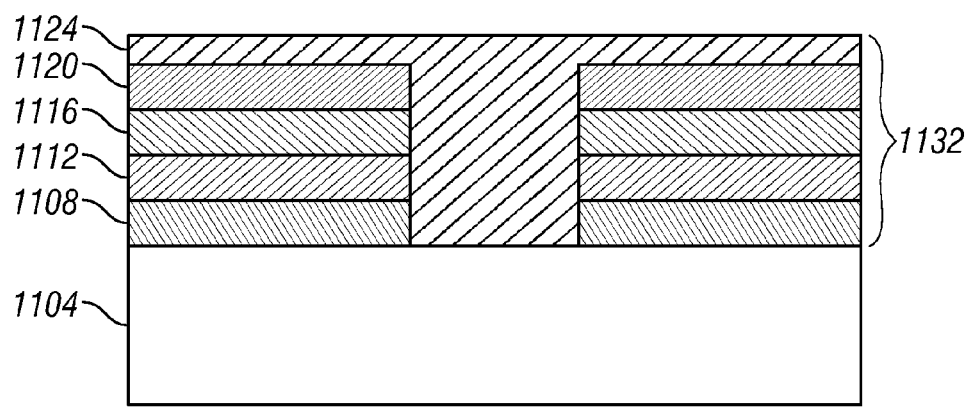

FIGS. 11A-11G illustrate a method of manufacturing a power generating black mask 1128 according to an embodiment. In this embodiment, the power generating black mask 1128 is manufactured for use in a display device. In FIG. 11A, the method starts with a substrate 1104. The substrate 1104 may comprise glass or any other material suitable for use as a substrate. In FIG. 11B, an anti-reflection layer 1108 is positioned over the substrate 1104. The anti-reflection layer 1108 reduces the amount of incoming light that is reflected back out of the device by optically matching the substrate 1104 and subsequent layer 1112. The anti-reflection layer 1108 may comprise multiple layers with alternating high and low refractive indices. Additionally, the anti-reflection layer may comprise $SiO_2$, $SiN_x$, $MgF_2$, ITO, $Al_2O_3$, $Yi_2O_3$, ZnO or any other material suitable for use as an anti-reflection layer. In FIG. 11C, a first electrode layer 1112 is positioned over the anti-reflection layer 1108. The first electrode layer 1112 may comprise ITO, or other substantially transparent materials suitable for use as an electrode. In FIG. 11D, a semi-conductor layer stack 1116 is positioned over the first electrode layer 1112. The semi-conductor layer stack 1116 may comprise p-n or p-i-n junction set of layers corresponding to typical Si, CdTe or any other semiconductor material set suitable for a photovoltaic cell. In FIG. 11E, the second electrode layer 1120 is positioned over the semi-conductor layer 1116. The second electrode layer 1120 may comprise ITO, Al, or any other material suitable for use as an electrode. The second electrode layer 1120 may be transparent or reflective. The power generating black mask 1128 comprises the anti-reflection layer 1108, the first electrode layer 1112, the semi-conductor layer 1116 and the second electrode layer 1120. In FIG. 11F, the power generating black mask 1128 is patterned. In this embodiment, the power generating black mask 1128 is patterned to allow pixel elements of the visual display to be positioned over the gaps in the power generating black mask 1128. A planarization layer 1124 may be deposited over the patterned power generating black mask 1128, as shown in FIG. 11G. The planarization layer 1124 allows the patterned power generating black mask 1128 to be used as an engineered substrate 1132 in other manufacturing processes. Manufacturing processes may build structures on top of the engineered substrate 1132 as if they were directly building onto a plain substrate such as glass, plastic, etc. For example, visual displays comprising IMOD's may be built on top of the surface of the engineered substrate 1132.

Figure 12A:
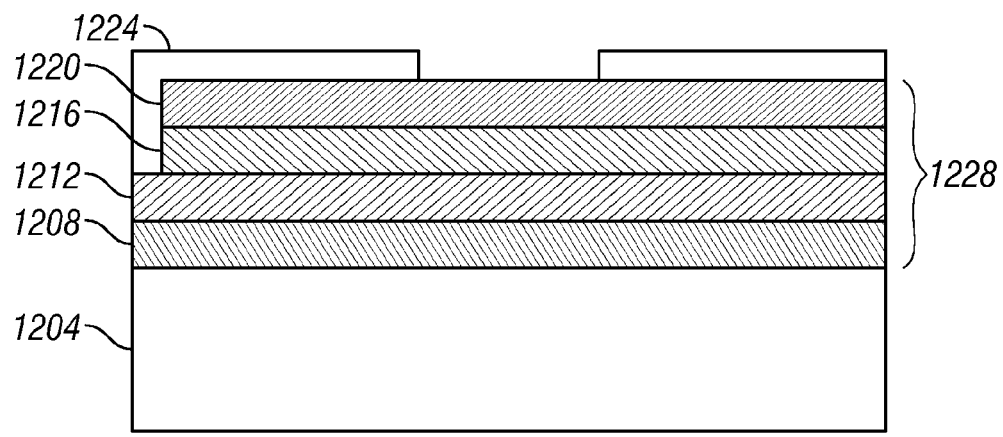
FIGS. 12A-12B illustrate a power generating black mask according to another embodiment.

FIG. 12A shows a power generating black mask according to another embodiment. In this embodiment, the method of manufacture is similar to FIGS. 11A-11E. An insulator layer 1224 is deposited over the power generating black mask 1228. The insulator 1224 is then patterned such that an opening is formed to the second electrode layer 1220. This exposes the second electrode layer 1220 and allows other structures to connect to the second electrode layer 1220.

Figure 12B:
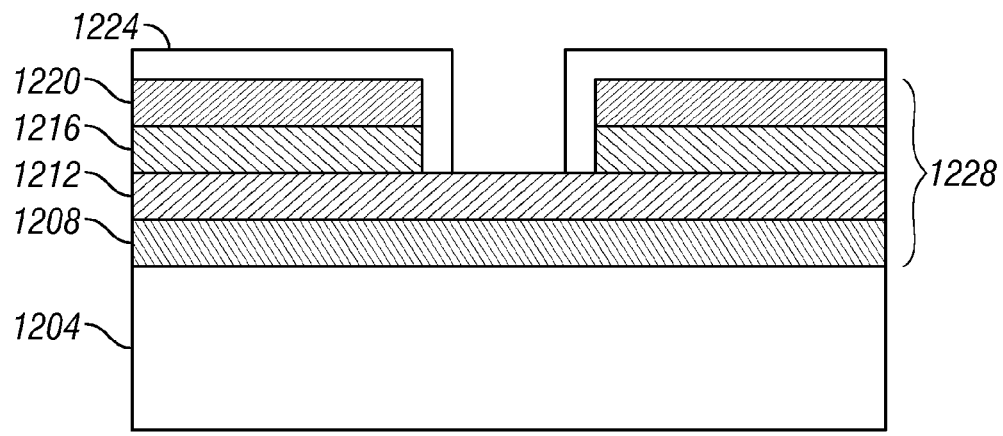

FIG. 12B shows a power generating black mask according to yet another embodiment. In this embodiment, the method of manufacture is similar to FIGS. 11A-11E. The power generating black mask 1228 is patterned such that an opening is formed to the first electrode layer 1212. An insulator layer 1224 is deposited over the opening formed to the first electrode layer. The insulator layer 1224 is then patterned such that an opening is formed to the first electrode layer 1212. This exposes the first electrode layer 1212 and allows other structures to connect to the first electrode layer 1212.

Figure 13:
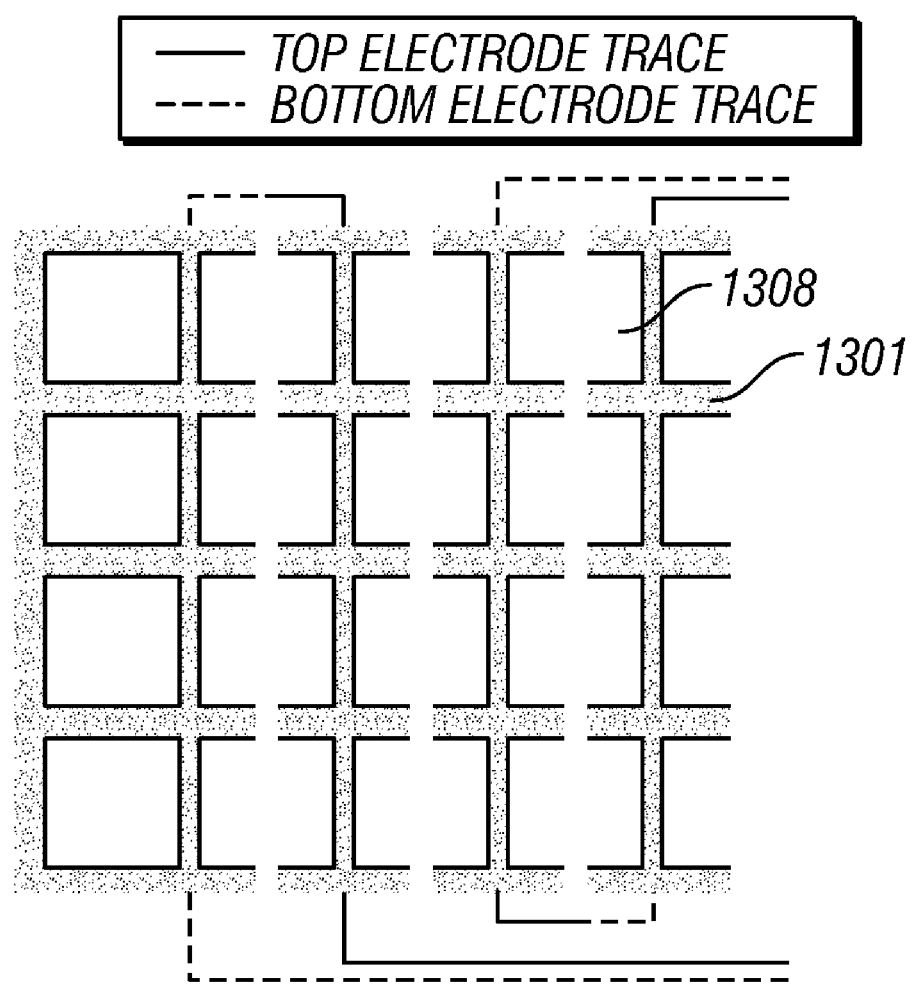
FIG. 13 illustrates a power generating black mask connected in series according to another embodiment.

FIG. 13 illustrates a power generating black mask according to another embodiment. This embodiment uses the embodiments described in FIGS. 12A-12B. The power generating black mask 1300 is shown from a top view. The power generating black mask 1300 is patterned to correspond to pixel elements which are located around openings 1320 and is divided into discrete sections 1304, 1308, 1312, and 1316. The sections 1304, 1308, 1312, and 1316 may be configured to expose the first electrode layer 1212 as illustrated in FIG. 12B or may be configured to expose the second electrode layer 1220 as illustrated in FIG. 12A. Or the sections 1304, 1308, 1312, and 1316 may be configured such that a portion of the section exposes the first electrode layer and a portion of the section 1312 exposes the second electrode layer. This allows the sections to be connected in series or in parallel. In FIG. 13, the sections 1312 are connected in series by pairs of columns. Section 1316 is connected to section 1312 in series and section 1308 and section 1304 are connected in series. The specification in no way limits the configurations of the connections or the configurations of the exposed electrode layers. The sections of the power generating black mask 1304, 1308, 1312, and 1316 may be connected in series, in parallel or a combination of both. The sections of the power generating black mask may expose the first electrode layer 1212, the second electrode layer 1330 or a combination of both. The configuration of the sections and the electrode layers may be specific to the device that uses the power generating black mask 1300. For example, a device requiring a higher voltage may connect the sections 1304, 1308, 1312, and 1316 in series and connect the electrode layers as shown in FIG. 13.

The following is a conservative estimate for the amount of power generated by a power generating black mask according to an embodiment. The power generating black mask comprises approximately 10% of the display area of a 1.8 inch diagonal IMOD display. The width of the display is 0.035 meters and the height of the display is 0.040 meters resulting in a display area of 0.0014 meters squared. The black mask covers approximately 10% of the display area, which is 0.00014 meters squared. The electrical efficiency of the power generating black mask is 10%. The amount of incoming sunlight is 1000 W/m$^2$ and for a conservative estimate, only 50% of the incoming sunlight is assumed to be reaching the power generating black mask. The 1000 W/m$^2$ is the amount of sunlight received under optimal conditions. Optimal conditions may include receiving sunlight during noontime, in an area closer to the equator and in an area without clouds or fogs. With the conditions given in the following example, the estimated amount of power generated by a 1.8 inch diagonal display is 7 milliwatts or 0.007 watts. This is calculated as 500 W/m$^2$ multiplied by the black mask area which is 0.00014 m$^2$ which is then multiplied by the 10% electrical efficiency of the power generating black mask. Black masks may cover approximately 10%-30% of the display area. The power generating black mask may have electrical efficiencies in the range of 5%-20%. The amount of incoming light that reaches the power generating black mask may depend on the time of the day, the weather (i.e. clouds or fog), geographic location and a variety of other conditions that may affect the amount of sunlight that may reach the device. The following example merely illustrates a conservative estimate of the amount of power generated by a power generating black mask and in no way limits the amount of power that may be generated by a power generating black mask. The amount of power generated may be different for different embodiments.

Figures 14A, 14B:
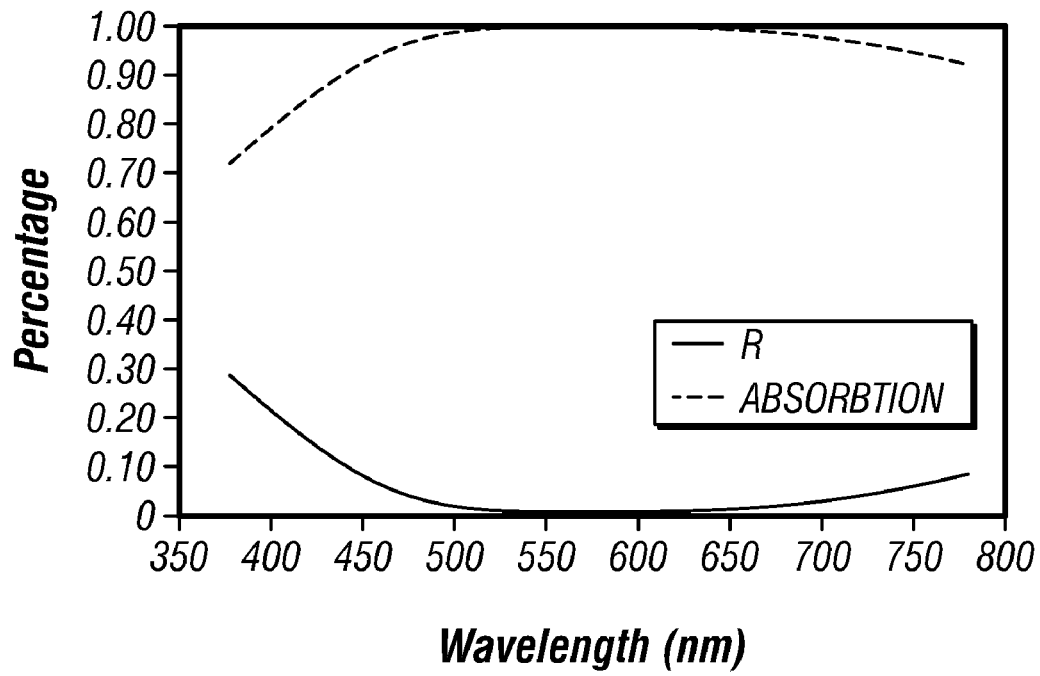
FIG. 14A is a graph illustrating the amount of light reflected and absorbed by en embodiment of the power generating black mask.
FIG. 14B is a table illustrating the materials and thickness of the layers of an embodiment of the power generating black.

FIG. 14A is a graph illustrating the amount of light reflected and absorbed by a power generating black mask. The x-axis of the graph represents the different wavelengths of incoming light. The y-axis represents a percentage. The y-axis is on a scale of 1, meaning that at 0.10, the percentage is 10%. As is show in the graph, the power generating black mask generally reflects small amounts of incoming light and absorbs the majority of incoming light. For example, at a 550 nm wavelength of light, approximately 0.5% of the incoming light is reflected and 99.5% percent of the incoming light is absorbed.

FIG. 14B is a table that illustrates the thickness and the materials used in the electrode and semiconductor layers of a power generating black mask according to an embodiment. The first electrode layer is transparent and comprises ITO and is approximately 72 nm thick. The semiconductor layer comprises a-Si and is approximately 15 nm thick. The second electrode layer is reflective and comprises Cr and is approximately 100 nm thick. The power generating black mask illustrated in this embodiment reflects approximately 0.5% of incoming light.

The embodiments described above provide the functionality of a black mask while providing additional benefits. A power generating black mask according to an embodiment allows devices which use a black mask to be more power efficient while reflecting less then one percent of incoming light. The power generating black mask may be used to reduce the amount of power used by the device using the power generating black mask. In addition, the power generating black mask may be used to generate power to run or charge at least one component of a device using the power generating black mask. In another embodiment, the power generating black mask may be patterned to provide openings to either the first or the second electrode layer or both. In another embodiment, the power generating black mask make be divided into discrete sections and the sections may be connected in series or in parallel or in both. While various embodiments described herein pertain to MEMS or visual displays, it will be understood that the disclosure is not limited to use in such devices. Any device that uses a black mask may use embodiments of the invention.

It will be understood that numerous and various modifications can be made from those previously described embodiments and that the forms of the invention described herein are illustrative only and are not intended to limit the scope of the invention. The detailed description of certain embodiments presents various descriptions of specific embodiments of the invention. However, the invention can be embodied in a multitude of different ways as defined and covered by the claims.

The terminology used in the description presented herein is not intended to be interpreted in any limited or restrictive manner, simply because it is being utilized in conjunction with a detailed description of certain specific embodiments of the invention. Furthermore, embodiments of the invention may include several novel features, no single one of which is solely responsible for its desirable attributes or which is essential to practicing the inventions herein described.

What is claimed is:

1. An electronic device comprising:
   a display area comprising a plurality of optical display elements, and
   a photovoltaic black mask deposited in the areas between the optical display elements of the display area and positioned between a substrate and the optical display elements, wherein the photovoltaic black mask comprises:
   at least one layer being configured to absorb light,
   at least one layer being configured to generate power,
   an anti-reflection layer deposited over a substrate,
   a first electrode layer deposited over the anti-reflection layer,
   a semiconductor layer deposited over the first electrode layer, and a second electrode layer deposited over the semiconductor layer,
wherein the anti-reflection layer comprises at least one layer of material.

2. The electronic device of claim 1, wherein the photovoltaic black mask comprises at least ten percent of the display area.

3. An electronic device comprising:
a display area comprising a plurality of optical display elements, and
a photovoltaic black mask deposited in the areas between the optical display elements of the display area and positioned between a substrate and the optical display elements, wherein the photovoltaic black mask comprises:
at least one layer being configured to absorb light,
at least one layer being configured to generate power,
an anti-reflection layer deposited over a substrate,
a first electrode layer deposited over the anti-reflection layer,
a semiconductor layer deposited over the first electrode layer, and
a second electrode layer deposited over the semiconductor layer,
wherein the photovoltaic black mask is patterned such that an opening is formed through the second electrode layer and the semiconductor layer to the first electrode layer,
wherein an insulator is positioned over the second electrode layer and semiconductor layers, and
wherein the insulator is patterned such that an opening is formed through the insulator to the second first electrode layer.

4. An electronic device comprising:
a display area comprising a plurality of optical display elements, and
a photovoltaic black mask deposited in the areas between the optical display elements of the display area and positioned between a substrate and the optical display elements, wherein the photovoltaic black mask comprises:
at least one layer being configured to absorb light,
at least one layer being configured to generate power,
an anti-reflection layer deposited over a substrate,
a first electrode layer deposited over the anti-reflection layer,
a semiconductor layer deposited over the first electrode layer, and
a second electrode layer deposited over the semiconductor layer,
wherein an insulator is positioned over the second electrode layer, and
wherein the photovoltaic black mask is patterned such that an opening is formed through the insulator to the second electrode layer.

5. An electronic device comprising:
a display area comprising a plurality of optical display elements, and
a photovoltaic black mask deposited in the areas between the optical display elements of the display area and positioned between a substrate and the optical display elements, wherein the photovoltaic black mask comprises:
at least one layer being configured to absorb light,
at least one layer being configured to generate power,
an anti-reflection layer deposited over a substrate,
a first electrode layer deposited over the anti-reflection layer,
a semiconductor layer deposited over the first electrode layer, and
a second electrode layer deposited over the semiconductor layer,
wherein the photovoltaic black mask is patterned into discrete sections.

6. The electronic device of claim 5, wherein the electrodes in the sections are connected in series or in parallel.

7. A method of making a photovoltaic black mask, the method comprising:
depositing an anti-reflection layer over a substrate;
depositing a first electrode over the anti-reflection layer;
depositing a semiconductor layer over the first electrode layer;
depositing a second electrode over the semiconductor layer; and
patterning a portion of the anti-reflection layer, the first electrode layer, the semiconductor layer, and the second electrode layer.

8. The method of claim 7, wherein the anti-reflection layer comprises at least one layer of material.

9. The method of claim 7, the method further comprising depositing a planarization layer over a portion of the first electrode layer, the semiconductor layer, and the second electrode layer.

10. The method of claim 7, wherein the first electrode is transparent.

11. The method of claim 9, wherein the planarization layer is configured to be electrically insulated.

12. The method of claim 9, wherein the planarization layer is configured to be transparent.

13. The method of claim 7, the method further comprising:
patterning the second electrode layer and the semiconductor layer such that an opening is formed to the first electrode layer,
depositing a electrically insulated planarization layer over the first electrode layer, the second electrode layer and the semiconductor layer, and
patterning the planarization layer such that an opening is formed to the first electrode layer through the planarization layer.

14. The method of claim 9, the method further comprising:
patterning the planarization layer such that an opening is formed to the second electrode layer.

* * * * *

UNITED STATES PATENT AND TRADEMARK OFFICE
CERTIFICATE OF CORRECTION

| | | |
|---|---|---|
| PATENT NO. | : 7,969,641 B2 | Page 1 of 1 |
| APPLICATION NO. | : 12/371538 | |
| DATED | : June 28, 2011 | |
| INVENTOR(S) | : Ion Bita et al. | |

It is certified that error appears in the above-identified patent and that said Letters Patent is hereby corrected as shown below:

At Column 14, Line 19, change "then" to --than--.

At Column 15, Line 31, in Claim 3, after "second" delete "first".

Signed and Sealed this
Twenty-fourth Day of April, 2012

David J. Kappos
*Director of the United States Patent and Trademark Office*